(12) United States Patent
Qin et al.

(10) Patent No.: US 10,509,289 B2
(45) Date of Patent: Dec. 17, 2019

(54) DISPLAY DEVICE

(71) Applicants: BOE TECHNOLOGY GROUP CO., LTD., Beijing (CN); KENT STATE UNIVERSITY, Kent, OH (US)

(72) Inventors: Guangkui Qin, Beijing (CN); Dengke Yang, Beijing (CN); Xiaochen Zhou, Beijing (CN)

(73) Assignees: BOE TECHNOLOGY GROUP CO., LTD., Beijing (CN); KENT STATE UNIVERSITY, Kent, OH (US)

( * ) Notice: Subject to any disclaimer, the term of this patent is extended or adjusted under 35 U.S.C. 154(b) by 155 days.

(21) Appl. No.: 15/661,123

(22) Filed: Jul. 27, 2017

(65) Prior Publication Data
US 2018/0031875 A1    Feb. 1, 2018

(30) Foreign Application Priority Data

Jul. 27, 2016 (CN) .......................... 2016 1 0600250

(51) Int. Cl.
G02F 1/137     (2006.01)
F21V 8/00      (2006.01)
(Continued)

(52) U.S. Cl.
CPC ........... G02F 1/137 (2013.01); G02B 6/0036 (2013.01); G02B 6/0068 (2013.01); G02F 1/1334 (2013.01); G02F 1/1337 (2013.01); G02F 1/133512 (2013.01); G02F 1/133553 (2013.01); G02F 1/133615 (2013.01); G02F 1/133621 (2013.01); G02F 1/195 (2013.01);
(Continued)

(58) Field of Classification Search
None
See application file for complete search history.

(56) References Cited

U.S. PATENT DOCUMENTS 6,612,722 B2 *   9/2003   Ryu ..................... G02B 6/0036
                                                349/65
6,692,797 B1 *   2/2004   Owen .................. C07C 69/734
                                                349/124

(Continued)

FOREIGN PATENT DOCUMENTS

CN    102608808 A    7/2012
CN    102707487 A    10/2012
(Continued)

OTHER PUBLICATIONS

Taiwan Office Action dated Nov. 28, 2017; Appln. No. 106125258.

Primary Examiner — Dung T Nguyen
Assistant Examiner — David Y Chung

(57) ABSTRACT

An embodiment of the present disclosure provides a display device, including: a liquid crystal display panel, comprising a liquid crystal layer including a polymer network formed of a polymerizable monomer; a light guide component, wherein the light guide component is configured such that light from the light source is emitted out from the first surface of the light guide component into the liquid crystal display panel, and in a case that the liquid crystal layer is not applied with a voltage, light from the light source is totally reflected at the liquid crystal display panel without being emitted from a side of the second substrate opposite to the first substrate into the outside air.

16 Claims, 7 Drawing Sheets

(51) Int. Cl.
*G02F 1/1334* (2006.01)
*G02F 1/1335* (2006.01)
*G02F 1/1337* (2006.01)
*G02F 1/19* (2019.01)

(52) U.S. Cl.
CPC .............. *G02F 2001/13345* (2013.01); *G02F 2001/133622* (2013.01); *G02F 2001/133742* (2013.01); *G02F 2203/02* (2013.01)

(56) References Cited

U.S. PATENT DOCUMENTS

| | | | |
|---|---|---|---|
| 6,774,964 B2* | 8/2004 | Funamoto | G02F 1/133553 349/113 |
| 7,969,531 B1* | 6/2011 | Li | G02B 6/0056 349/200 |
| 2002/0080301 A1* | 6/2002 | Takahashi | G02B 6/0068 349/61 |
| 2012/0050646 A1* | 3/2012 | Huang | G02F 1/133555 349/65 |
| 2013/0027857 A1 | 1/2013 | Jeong | |
| 2014/0292839 A1 | 10/2014 | Huang | |
| 2015/0293402 A1* | 10/2015 | Shinkai | G02F 1/13476 349/15 |
| 2015/0330597 A2 | 11/2015 | Schaffer et al. | |

FOREIGN PATENT DOCUMENTS

| | | |
|---|---|---|
| CN | 103185983 A | 7/2013 |
| CN | 107229157 A | 10/2017 |
| TW | 201243447 A | 11/2012 |
| TW | M512147 U | 11/2015 |

\* cited by examiner

DISPLAY DEVICE

TECHNICAL FIELD

Embodiments of the present disclosure relates to a display device

BACKGROUND

The types of display technology not only include common display but also include transparent display and mirror display. As for the transparent display technology, a common transparent display device based on liquid crystal display (LCD) in the current market is to remove a backlight module at the rear of a display panel and arrange a lamp-house at the top rear of the display panel to provide light required for image display, but the display panel based on liquid crystal display has low light transmittance, so a display image of the display device has low contrast.

SUMMARY

An embodiment of the present disclosure provides a transparent display device comprising: a liquid crystal display panel, comprising a first substrate, a second substrate, and a liquid crystal layer positioned between the first substrate and the second substrate, wherein the liquid crystal layer includes a polymer network formed of polymerizable monomers; a light guide component, located on a side of the first substrate opposite to the second substrate, wherein the light guide component has a first main surface facing the liquid crystal display panel, and a second main surface opposite to the first main surface, and a side surface connecting the first main surface and the second main surface; and a light source, located on a side of the light guide component and configured to emit light to enter into the light guide component via the side surface, wherein the light guide component is configured such that light from the light source is emitted out from the first surface of the light guide component into the liquid crystal display panel, and in a case that no voltage is applied to the liquid crystal layer, light from the light source is totally reflected at the liquid crystal display panel without being emitted out from a side of the second substrate opposite to the first substrate into the outside air.

In an example, the first substrate is a first base substrate and the second substrate is a second base substrate, and light from the light source enters the first base substrate of the liquid crystal display panel with an incident angle greater than or equal to a total reflection critical angle of the second base substrate of the liquid crystal display panel to the outside air.

In an example, the light guide component includes a light guide plate and a transparent filling layer; the transparent filling layer is filled between the light guide plate and the liquid crystal display panel and in direct contact with the light guide plate and the liquid crystal display panel; a refractive index of the filling layer is larger than a refractive index of the outside air and smaller a refractive index of the light guide plate.

In an example, the light guide plate includes a light guide plate body and a plurality of optical microstructures formed on a surface of the light guide plate body facing the liquid crystal display panel, the optical microstructures are configured such that light from the light source exits the light guide plate body therefrom.

In an example, the light guide plate includes a light guide plate body and a plurality of optical microstructures formed inside the light guide plate body; the optical microstructures are configured to reflect light from the light source to exit the light guide plate body from a surface of light guide plate body facing the liquid crystal display panel.

In an example, a size of a surface area of the optical microstructures increases as the distance between the optical microstructure to the light source increases.

In an example, a distribution density of the optical microstructures increases as the distance between the optical microstructure to the light source increases.

In an example, an average value of angles between respective tangential planes of a surface of the optical microstructure and a surface of the light guide plate body is larger than arccos (n1/n2) and less than arccos (n4/n3), wherein, the first substrate and the second substrate are identical in refractive index, n1 is a refractive index of the transparent filling layer, n2 is the refractive index of the light guide plate, n3 is the refractive index of the first and the second substrate, n4 is a refractive index of the outside air; and among n1-n4, n2 is the largest, and n4 is the smallest.

In an example, a difference value between n2 and n1 is [0.05, 0.25].

In an example, the transparent filling layer is made of an adhesive material.

In an example, alignment films are provided on opposite surfaces of the first substrate and the second substrate, and at least one of the alignment films is oriented in a direction perpendicular to the liquid crystal display panel.

In an example, alignment directions of the alignment films on the first substrate and the second substrate are identical and parallel to the display surface of the liquid crystal display panel.

In an example, the side surface of the light guide component is parallel to the alignment directions of the alignment films.

In an example, the alignment directions of the alignment films on the first substrate and the second substrate are perpendicular to each other and are parallel to the display surface of the liquid crystal display panel.

In an example, the alignment directions of the alignment films on the first substrate and the second substrate are substantially perpendicular to the liquid crystal display panel.

In an example, the light source includes a plurality of sub-light sources, the colors of light emitted from the respective sub-light sources are different from each other; the display device further includes a field-sequential-color controller connected to the respective sub-light sources and is configured to control the respective sub-light source to emit light in different driving time periods of one frame.

In an example, the display device further including: a light blocking member located on a side of the light guide component away from the liquid crystal display panel.

In an example, the light blocking member comprises a reflective layer configured with a reflecting surface facing the light guide component.

In an example, the light blocking member includes a light absorbing layer for absorbing light.

In an example, an air layer is formed between the light absorbing layer and the light guide component.

BRIEF DESCRIPTION OF THE DRAWINGS

The accompanying drawings are provided for a further understanding of the embodiments of the present disclosure, constitute one part of the description, are used for explaining the embodiments of the present disclosure together with the following embodiment modes, and are not construed as the limitation of the embodiments of the present disclosure. In the accompanying drawings.

Figure 1:
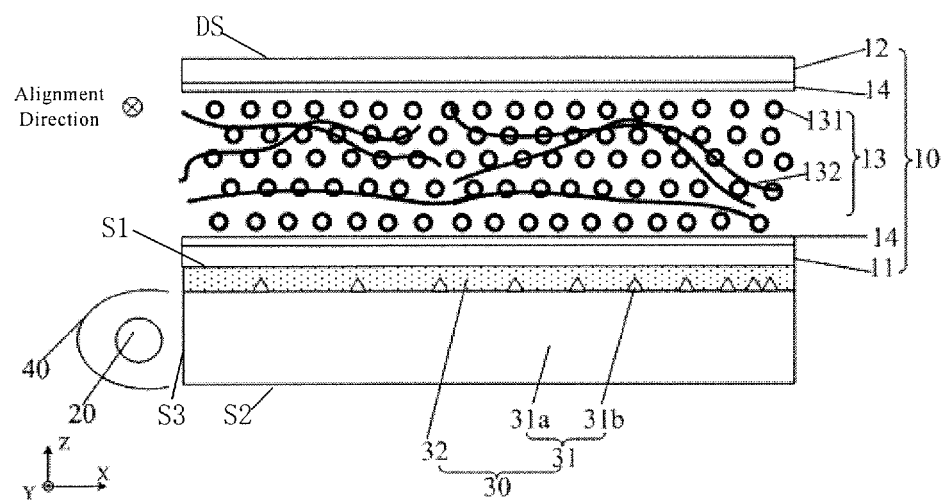
FIG. 1 is a schematic sectional view of a display device with a first structure provided by an embodiment of the present disclosure.

Reference numerals of the accompanying drawings: 10—LCD panel; 11—array substrate; 12—counter substrate; 13—liquid crystal layer; 131—nematic liquid crystal; 132—polymer network; 14—alignment film; 20—light source; 21—red sub-light source; 22—green sub-light source; 23—blue sub-light source; 30—light guide component; 31—light guide plate; 31a—light guide plate body; 31b—optical microstructure; 32—transparent filling layer; 40—reflective cover; 51—reflective layer; 52—light-absorbing layer; 60—field-sequential-color controller; 70—gate drive circuit; 80—source drive circuit.

DETAILED DESCRIPTION

Detailed description will be given below to the embodiment modes of the embodiments of the present disclosure with reference to the accompanying drawings. It should be understood that the preferred embodiments described here are for illustration and explanation only and not intended to limit the embodiment of the present disclosure.

In order to improve transmittance, a transparent liquid crystal display device based on polymer stabilized liquid crystal is proposed. In the display device, a light source emits light from a side of the display panel to a liquid crystal layer; when no voltage is applied to the display panel, the light is transmitted along the horizontal direction in the liquid crystal layer, and the display panel is in the transparent state; and when a driving voltage is applied to the display panel, light is scattered in the liquid crystal layer, and the display panel is in a display state. However, when the display panel displays an image, along with the increased number of light paths, when light propagates light in the liquid crystal layer, the total energy scattered is significantly degraded, so that the display uniformity is poor.

An embodiment of the present disclosure provides a display device. As illustrated in FIG. 1, the display device comprises: a liquid crystal display panel 10, a light source 20 and a light guide component 30, wherein the liquid crystal display panel 10 includes an array substrate 11 (as an example of first substrate), a counter substrate 12 (as an example of second substrate) and a liquid crystal layer 13 disposed between the array substrate 11 and the counter substrate 12. The liquid crystal layer 13 is mixed with a polymer network 132 formed by polymerizable monomers. The array substrate 11 includes, for example, a first base substrate and a plurality of pixel units formed on the first base substrate, wherein each pixel unit includes a switching element and a pixel electrode. The counter substrate 12 includes, for example, a second base substrate and layers formed thereon, for example, color filter layer. Here, for the sake of simplicity, the first base substrate 11 is shown as the array substrate 11, and the second base substrate 12 is shown as the counter substrate 12. For example, both the first base substrate 11 and the second base substrate 12 are glass substrates and have a thickness of, for example, more than 100 microns, respectively.

The light guide component 30 is disposed on a side of the array substrate 11 away from the counter substrate 12, and includes a top surface S1 facing the liquid crystal display panel 10, a bottom surface S2 arranged opposite to the top surface S1, and side surfaces S3 connected between the top surface S1 and the bottom surface S2. The light source 20 is disposed on the side surface S3 of the light guide component 30 and configured to emit light towards the light guide component 30. The light guide component 30 is configured to diffuse light emitted by the light source 20 to form a surface light source which emits light towards the liquid crystal display panel 10. The light guide component 30 is configured such that light from the light source 20 is emitted out from the top surface S1 of the light guide component 30 into the liquid crystal display panel 10, and in a case that no driving voltage is applied to the liquid crystal layer 13, light from the light source is totally reflected at the liquid crystal display panel 10 without being emitted out from a side of the second substrate 12 opposite to the first substrate 11 into the outside air. For example, an included angle between the direction of light incident into the liquid crystal display panel 10 by the surface light source and the thickness direction of the liquid crystal display panel 10 (for example, the Z-direction perpendicular to the liquid crystal display panel 10) is greater than the critical angle of total reflection of any light when incident into the outside air from the liquid crystal display panel 10. That is, the light guide component 30 is configured such that light from the light source 20 is emitted from the first surface S1 of the light guide assembly 30 into the liquid crystal display panel 10, wherein light from the light source 20 enters the liquid crystal display with an incident angle greater than or equal to the total reflection critical angle of the liquid crystal display panel 10 to the air.

For example, the total reflection critical angle of the liquid crystal display panel 10 to the air refers to the total reflection critical angle of the uppermost layer in direct contact with air in the liquid crystal display panel to the air. When the light is incident into the liquid crystal display panel 10, the light will be incident into the array substrate 11, the liquid crystal layer 13 and the counter substrate 12 in sequence. As the refractive index of the array substrate 11 and the counter substrate 12 is substantially the same or similar, the included angle between the direction of the light incident into the liquid crystal display panel 10 and the thickness direction of the liquid crystal display panel 10 may be seen as an incident angle of light when incident into an interface of the counter substrate 12 and the outside air. When the incident angle is greater than the total reflection critical angle of the second substrate 12 of the liquid crystal display panel 10 to the air, the light is subjected to total reflection and will not be incident into the outside air, so the light is generally transmitted horizontally in the liquid crystal display panel 10.

It is understood that although in the above embodiments, the light from the light source 20 is totally reflected at the interface between the second base substrate and the outside air so as not to be emitted out from the top surface S1 of the liquid crystal display panel 10 into the outside air, the light from the light source 20 may be totally reflected at other interface in the counter substrate (e.g., at the interface between the color film layer and the second base substrate) so as not to be emitted from the top surface S1 of the liquid crystal display panel 10 to the outside air in other examples.

In the embodiment of the present disclosure, the liquid crystal layer 13 is a nematic liquid crystal layer, namely including nematic liquid crystals 131 and a polymer network 132. In the manufacturing process, the nematic liquid crystals 131 and the polymerizable monomers are mixed and filled between the array substrate 11 and the counter substrate 12, and subsequently, the liquid crystal mixture is cured, so that the polymer network 132 can be formed from the polymerizable monomers and separated from the nematic liquid crystals 131. Of course, the liquid crystal layer 13 may also be a cholesteric liquid crystal layer, in which the pitch of cholesteric liquid crystal molecules is greater than 1 μm.

Figure 2:
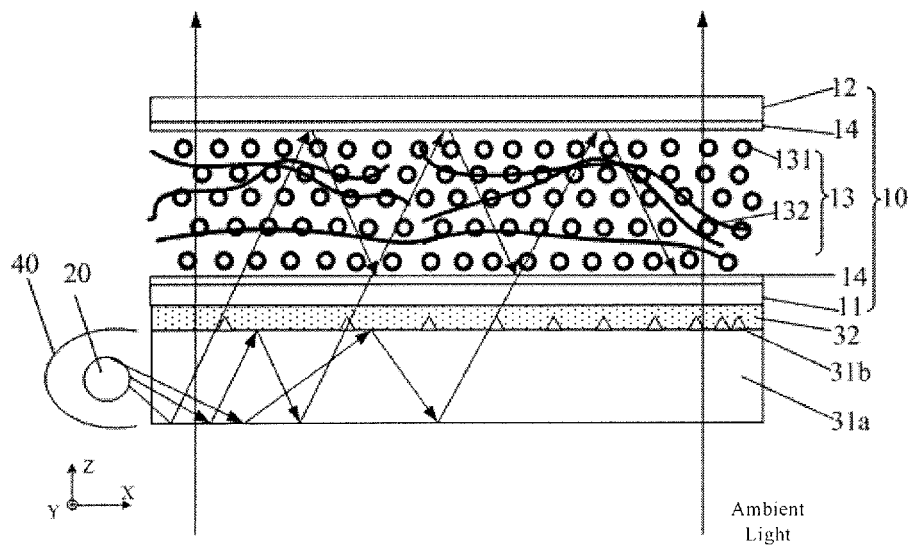
FIG. 2 is a schematic diagram of the display device in FIG. 1 in a transparent state.
Figure 3:
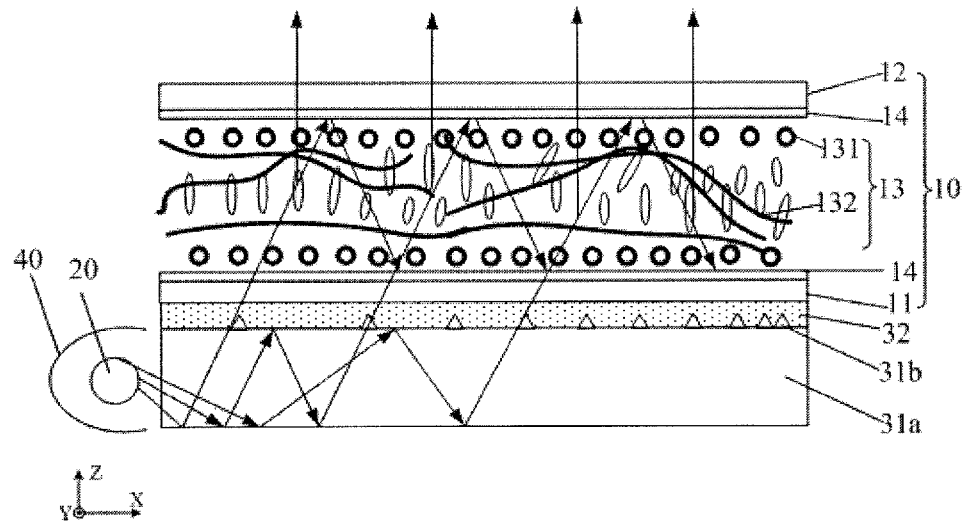
FIG. 3 is a schematic diagram 1 of the display device in FIG. 1 in a scattering state.
Figure 4:
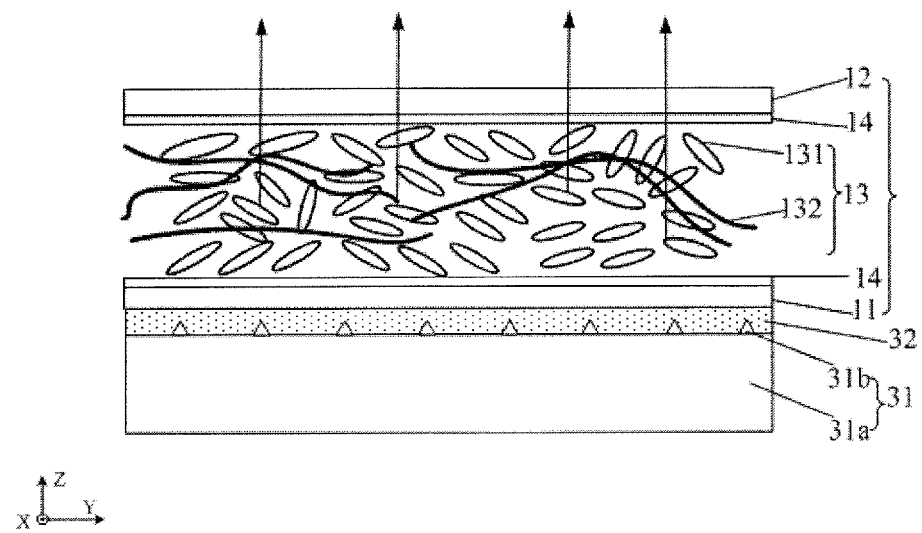
FIG. 4 is a schematic diagram 2 of the display device in FIG. 1 in a scattering state.

The liquid crystal display panel 10 includes two states, namely transparent state and scattering state. FIG. 2 is a schematic diagram of the display device in FIG. 1 in the transparent state. FIGS. 3 and 4 are schematic diagrams of the display device in FIG. 1 in the scattering state, in which FIG. 3 and FIG. 4 are respectively schematic diagrams of two mutually perpendicular longitudinal sections of the display device. As shown in FIG. 2, when no electric field is applied to the liquid crystal display panel 10, nematic liquid crystals 131 in the same layer in the liquid crystal layer 13 are consistent in alignment. As for the same light beam, the refractive index does not change when the light is transmitted in the liquid crystal layer 13, and the light will not be scattered in the process of horizontal transmission in the liquid crystal layer by reflection, so the liquid crystal display panel 10 is in the transparent state (dark state). When the display device is used for transparent display, no light-shielding structure is disposed on a side of the light guide component 30 away from the liquid crystal display panel 10, so ambient light on the back of the display device can run through the liquid crystal display panel 10, and hence scenes behind the display device can be seen from a light-emitting side of the liquid crystal display panel 10. When electric field is applied in the liquid crystal display panel 10, the nematic liquid crystals 131 will have disordered alignments as shown in FIGS. 3 and 4 due to the influence of the polymer network 132: the alignment of the nematic liquid crystals 131 is divided into numerous small regions; moreover, due to the anisotropic property of the nematic liquid crystals 131, the refractive index of the nematic liquid crystals is different in the long-axis direction and the short-axis direction; and in this case, as different regions have different alignment states, the light refractive index of different regions will also be different. Therefore, in this case, the light will be scattered, that is, when the light incident into the liquid crystal display panel 10 is transmitted along the horizontal direction in the liquid crystal layer 13, partial light will be emitted from the surface of the liquid crystal display panel 10, and the liquid crystal display panel 10 will be in the scattering state (bright state), so that a display image can be seen from the light-emitting side of the liquid crystal display panel 10. Moreover, in the case of the content of the polymer network 132 is fixed, when the electric field is stronger, the scattering degree of the light is higher, and the light outgoing quantity is larger. Therefore, display can be achieved by direct controlling the electric field intensity of pixel units and the light outgoing quantity of the pixel units, and no polarizer is arranged.

It is understood that: if the light is directly emitted to the liquid crystal layer 13 from an end surface of the liquid crystal display panel 10, the light is weaker when farther away from the light source 20. Therefore, when the electric field intensity of different regions of the liquid crystal display panel is consistent, the display uniformity may be poor. As the display device provided by the embodiment of the present disclosure comprises the light guide component 30, the light guide component 30 can diffuse the light from the light source 20 to form a surface light source with uniform emission. Moreover, the light of the surface light source is uniformly incident into the liquid crystal display panel from different positions and then transmitted horizontally in the liquid crystal layer 13. Therefore, when the liquid crystal display panel 10 is in the scattering state, the emergent light is more uniformly distributed, so the display uniformity can be improved.

For example, as shown in FIG. 1, the light guide component 30 includes a light guide plate 31 and a transparent filling layer 32 filled between the light guide plate 31 and the liquid crystal display panel 10. The light source 20 is disposed on the side surface of the light guide plate 31. The light guide plate 31 is configured to diffuse the light from the light source 20 to form a surface light source. The refractive index of the filling layer 32 is greater than the refractive index of the air and less than the refractive index of the light guide plate 31. The transparent filling layer 32 is arranged to prevent the production of air gaps between the light guide plate 31 and the liquid crystal display panel 10. Once there is an air gap between the light guide plate 31 and the liquid crystal display panel 10, large difference between the refractive index of the light guide plate 31 and the refractive index of the air will allow light emitted from the light guide plate 31 to be obviously refracted when entering an air layer, thus producing obvious atomization phenomenon. The transparent filling layer 32 can reduce the deflection degree of the light when entering the transparent filling layer 32 from the light guide plate 31, so as to reduce the atomization phenomenon produced due to the arrangement of the light guide plate 31. Therefore, the display contrast is guaranteed when the display uniformity is improved.

Moreover, for example, as shown in FIG. 1, the light guide plate 31 includes a light guide plate body 31a and a plurality of optical microstructures 31b. The optical microstructures 31b are formed on a surface of the light guide plate body 31a facing the liquid crystal display panel 10; surfaces of the optical microstructures 31b are formed as a light-emitting surface; and light incident into the light guide plate body 31a from the light source 20 is subjected to total reflection in the light guide plate body 31a and emitted from the light-emitting surface of the optical microstructure 31b. The angle of the light emitted by the light source 20 shall satisfy the condition that: after the light from the light source 20 is incident into the light guide plate body 31a, both the incident angles on the bottom surface and the top surface of the light guide plate body 31a are greater than the total reflection critical angle of the optical microstructure 31b to the air, so that the light can be subjected to total reflection. Due to the arrangement of the optical microstructure 31b, the incident angle of the light on the surface of the optical microstructure 31b is less than the total reflection critical angle, so that the light can only be emitted from the light-emitting surface of the optical microstructure 31b and no light will be emitted from other positions.

The specific shape of the optical microstructure 31b is not limited in the embodiment of the present disclosure, as long as the condition of total reflection can be destroyed, so that the light can be emitted from the surface of the optical microstructure 31b into the liquid crystal display panel with the above described incident angle. For instance, the optical microstructure 31b may be convex structures in different shapes and may also be concave structures in different shapes. When the optical microstructures 31b are convex structures, the optical microstructures 31b and the light guide plate body 31a may be integrally formed by injection moulding process, so that the optical microstructure and the light guide plate body can have same refractive index. When the optical microstructures 31b are concave structures, the optical microstructures 31b may be formed on the light guide plate body 31a by diamond drilling method.

Figure 13:
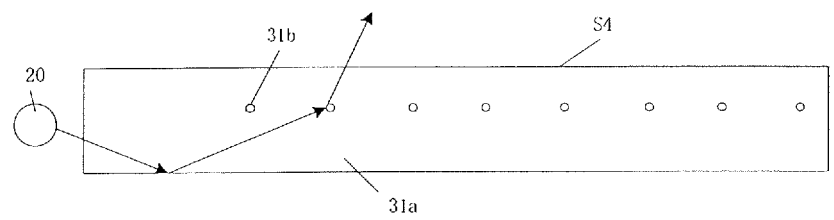
FIG. 13 is a schematic diagram of the microstructures of the light guide assembly in the display device provided in an embodiment of the present disclosure.

In another example, referring to FIG. 13, the optical microstructures 31b are formed inside the light guide plate body 31a, and the optical microstructure 31b is configured to reflect light from the light source to be emitted out from the surface S4 of the light guide plate body facing the liquid crystal panel.

In order to avoid the case that the density of the light emitted by the light guide plate 31 is smaller when the light is farther away from the light source 20, the overall distribution of the light emitted by the light guide plate 31 can be more uniform by adjustment of the shape of the optical microstructures 31b at different positions or the distribution of the optical microstructures 31b.

Figure 14:
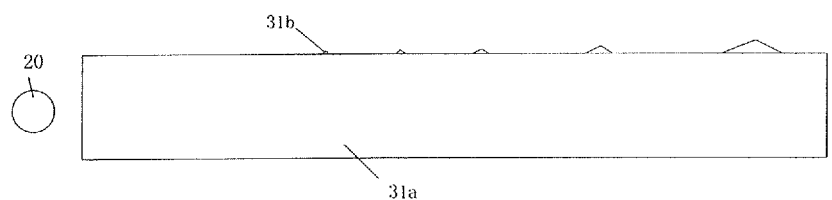
FIG. 14 is a schematic diagram showing the microstructures of the light guide assembly in the display device provided in an embodiment of the present disclosure.

For example, the size of the surface of the optical microstructure 31b is increased along with the increase of the distance from the optical microstructure 31b to the light source 20, referring to FIG. 14. That is, the larger the distance between the optical microstructure 31b and the light source 20, the greater the surface area of the optical microstructure. In the case of uniform distribution of incident light, more light is emitted by the optical microstructure 31b farther away from the light source 20. As the density of the light incident into a position farther away from the light source 20 is smaller, the overall distribution of the light emitted by the light guide plate 31 is more uniform.

Under the limitation of the thickness of the light guide plate 31, the requirement on the manufacturing process of manufacturing the plurality of optical microstructures 31b with different surface areas is high. Therefore, for the convenience of production, for example, as shown in FIG. 1, the distribution density of the optical microstructures 31b is increased along with the increase of the distance from the optical microstructures 31b to the light source 20. In the case of uniform distribution of incident light, the optical microstructures 31b are more densely distributed at areas farther away from the light source 20, and more light is emitted out. As the density of light incident into positions farther away from the light source 20 in the liquid crystal display body 31a is smaller, the overall distribution of the light emitted from the light guide plate 31 is more uniform.

Of course, the uniformity of the light emitted by the light guide plate 31 may also be improved by adoption of the above two means simultaneously, that is, the surface area of a single optical microstructure 31b is gradually increased while the distribution density of the optical microstructures 31b is gradually increased from the direction from position close to the light source 20 to position away from the light source 20.

In order to improve the light utilization and the display contrast, for example, the average a of the included angles between tangential planes on the surface of the optical microstructure 31b and the surface (for example, the lower flat surface) of the light guide plate body 31a satisfies:

$$\arccos(n4/n3) > \alpha > \arccos(n1/n2)$$

wherein, the refractive index of the array substrate 11 and the counter substrate 12 is substantially the same; n1 refers to the refractive index of the transparent filling layer; n2 refers to the refractive index of the light guide plate; n3 refers to the refractive index of the array substrate 11 and the counter substrate 12; n4 refers to the refractive index of the air (usually can be regarded as 1); and among n1-n4, n2 is maximum and n4 is minimum. Optionally, n3>n1 is satisfied, so as to ensure that the light incident into the transparent filling layer 32 from the light guide plate 31 can be completely incident into the liquid crystal display panel 10.

It should be noted that the n3 herein may be regarded as the refractive index of the base substrates of the array substrate 11 and the counter substrate 12. When the optical microstructures 31b are convex structures, the optical microstructures 31b and the light guide plate body 31a have same refractive index which are both n2; and when the optical microstructures 31b are concave structures, the refractive index of the light guide plate body 31a is the refractive index of the light guide plate 31.

On one hand, the when light incident into the transparent filling layer 32 from the light guide plate body 31a, the total reflection critical angle $C1=\arcsin(n1/n2)$; and without arranging the optical microstructures 31b, the incident angle of the light incident into the transparent filling layer 32 from the light guide plate body is $\arcsin(n1/n2) \sim 90°$, in which the maximum incident angle is close to 90°. It should be understood that: with the optical microstructures 31b are arranged, other light may also be incident into a transparent filling layer 90 through the optical microstructures 31b as long as the light of which the original incident angle is close to 90° may be incident into the transparent filling layer 90 through the optical microstructures 31b. When the optical microstructures 31b are arranged and $\alpha > \arccos(n1/n2)$ is satisfied, the actual incident angle of the light of which the original incident angle is close to 90° when incident into the transparent filling layer 32 from the optical microstructures 31b is less than $90°-\arccos(n1/n2)$, namely less than C1; and in this case, the light can be incident into the transparent filling layer 32 and hence be incident into the liquid crystal display panel 10. On the other hand, when incident into the outside air from the counter substrate 12, the total reflection critical angle is $C2=\arcsin(n4/n3)$. When α is gradually increased, the incident angle of the light incident into the liquid crystal display panel 10 is gradually reduced. When α>(90°−C2), namely α>arccos(n4/n3), the incident angle of a part of light incident into the liquid crystal display panel is less than C2, so that this part of light can be directly emitted from the top of the counter substrate 12. Therefore, in the embodiment of the present disclosure, setting α>arccos(n1/n2) ensures that the light from the light source 20 can enter the liquid crystal display panel 10 after diffusion by the light guide component 30; and meanwhile, setting α<arccos(n4/n3) ensures that the light can be transmitted in the liquid crystal display panel 10 and cannot be emitted to the outside air.

As described above, when the difference between n2 and n1 is too large, the atomization phenomenon will be obvious; and when the difference between n2 and n1 is too small, a part of light incident into the light guide plate body 31a may be incident into the transparent filling layer 32 from region of the light guide plate body 31a where none of the optical microstructures 31b is provided, so that the uniformity of the emergent light of the light guide plate 31 can be affected. Therefore, in order to ensure that the light from the light source 20 is subjected to total reflection in the light guide plate body 31a and ensure that the light incident into the liquid crystal display panel 10 can propagate horizontally in the liquid crystal display panel 10, For example, the difference value between n1 and n2 is [0.05, 0.25].

For example, the transparent filling layer 32 is made from bonding materials, so that the liquid crystal display panel 10 and the light guide component 30 can be fixedly connected without adopting additional fixing structure.

When the long-axis direction of the liquid crystals is perpendicular to the transmission direction of the light, the light can be obviously scattered in the case that electric field is applied in the liquid crystal display panel 10. Therefore, in order to improve the display effect, the alignment direction of the liquid crystals may be set to be perpendicular to a preset horizontal direction. Optionally, alignment films 14 is disposed on both opposite surfaces of the array substrate 11 and the counter substrate 12; the light of the surface light source formed by diffusion through the light guide component 30 is transmitted along the preset horizontal direction in the liquid crystal layer 13 on the whole; and the alignment direction of at least one alignment film 14 is perpendicular to the preset horizontal direction. It should be understood that the alignment direction of the alignment film 14, for example, the direction of the long axis, refers to that: the alignment direction of the liquid crystals under the alignment action of the alignment films 14 when no voltage is applied to the liquid crystal display panel 10. Different alignment methods may be specifically adopted to treat surfaces of the alignment films 14, so that the liquid crystals can be aligned. Further description will be given below to the structure of the liquid crystal display panel 10 in the embodiment of the present disclosure with reference to different alignment directions of the alignment films 14.

The first alignment directions of the alignment films 14 are as shown in FIG. 1: the alignment films 14 on the array substrate 11 and the counter substrate 12 have a same alignment direction which is parallel to a display surface DS of the liquid crystal display panel 10. At this point, the light source 20 is disposed on any side surface of the light guide plate parallel to the alignment direction of the alignment films 14. It should be noted that an orthographic projection of the light guide component 30 in the embodiment of the present disclosure on the liquid crystal display panel 10 is rectangular, namely the light guide component 30 includes four side surfaces. As shown in FIG. 1, both the alignment directions of the two alignment films 14 are along the Y-axis direction, and the light source 20 is disposed on the left or the right of the light guide component 30 in FIG. 1, so that the light can be transmitted along the X-axis direction in the liquid crystal layer 13. Or both the alignment directions of the two alignment films 14 are along the X-axis direction, and the light source 20 is disposed in front or rear of the light guide component 30 in FIG. 1, so that the light can be transmitted along the Y-axis direction in the liquid crystal layer 13. When the alignment films 14 adopt such alignment direction, the liquid crystal display panel 10 is any one of an electrically controlled birefringence (ECB) liquid crystal display panel, an in-plane switching (IPS) liquid crystal display panel and a fringe-field switching (FFS) liquid crystal display panel. No matter which display panel is adopted, pixel electrode and common electrode (not shown in the figure) used for producing electric fields are also included. Wherein, in the ECB liquid crystal display panel, the pixel electrodes is disposed on the array substrate 11 and the common electrode is disposed on the counter substrate 12; in the IPS liquid crystal display panel, both the pixel electrodes and the common electrodes are disposed on the array substrate and are strips, and the striped pixel electrode and the striped common electrode are arranged in the same layer and alternately arranged; and in the FFS liquid crystal display panel, both the pixel electrode and the common electrode are disposed on the array substrate, the pixel electrode being strips, the common electrode being platy, both the pixel electrodes and the common electrodes being arranged in different layers which are insulated and spaced from each other.

Figure 5:
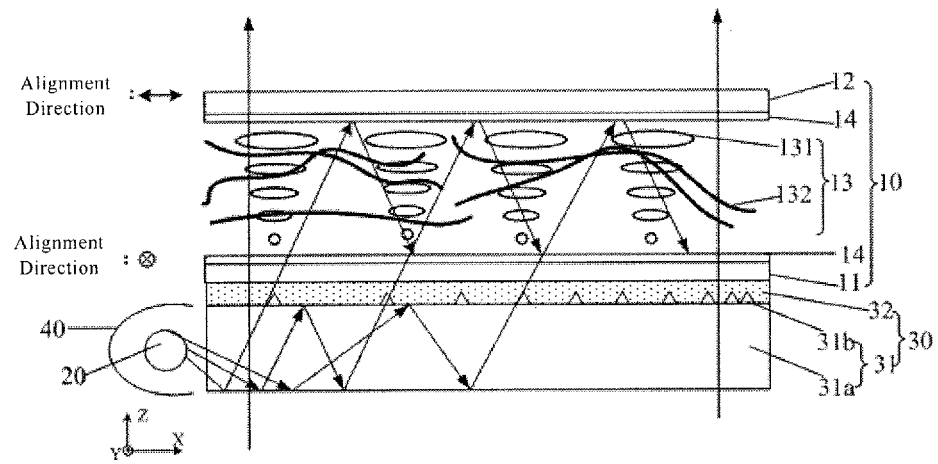
FIG. 5 is a schematic diagram of a display device with a second structure provided by an embodiment of the present disclosure in the transparent state.

The second alignment directions of the alignment films 14 are as shown in FIG. 5: both the alignment directions of the alignment films 14 on the array substrate 11 and the counter substrate 12 are parallel to a display surface of the liquid crystal display panel 10, and the alignment directions of the two alignment films 14 are perpendicular to each other. As shown in FIG. 5, the alignment direction of the alignment film on the array substrate 11 is along the Y-axis direction, and the alignment direction of the alignment film 14 on the counter substrate 12 is along the X-axis direction. At this point, the light source 20 is disposed on any side surface of the light guide component 30, so that the transmission direction of the light can be perpendicular to the alignment direction of a part of liquid crystals. When the alignment directions of the alignment films 14 are as shown in FIG. 5, the liquid crystal display panel 10 is a twisted nematic (TN) liquid crystal display panel; the pixel electrode of the liquid crystal display panel is disposed on the array substrate 11; and the common electrode is disposed on the counter substrate 12.

Figure 6:
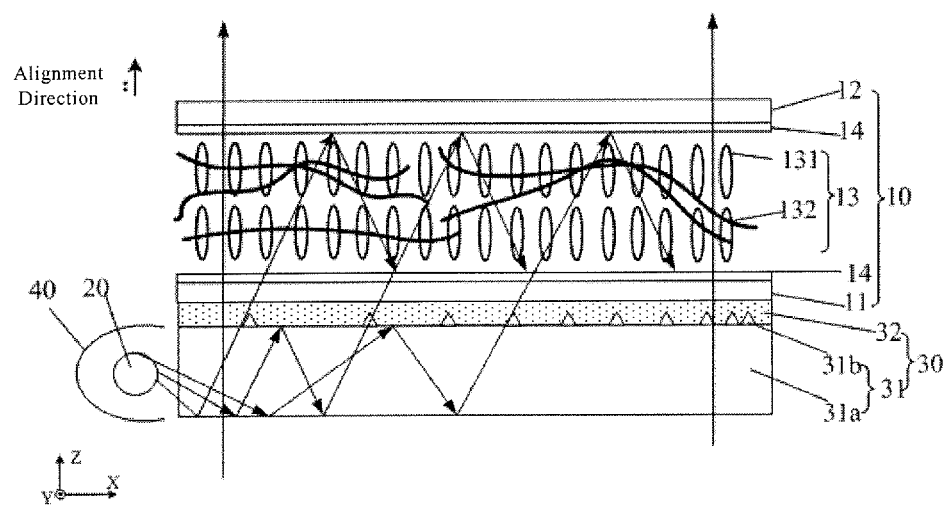
FIG. 6 is a schematic diagram of a display device with a third structure provided by an embodiment of the present disclosure in the transparent state.

The third alignment directions of the alignment films 14 are as shown in FIG. 6: both the alignment directions of the alignment films 14 on the array substrate 11 and the counter substrate 12 are along the thickness direction of the liquid crystal display panel 10, namely the Z-axis direction. At this point, in order to ensure that the transmission direction of the light in the liquid crystal layer 13 is perpendicular to the alignment direction of the liquid crystals, the transmission direction of the light in the liquid crystal layer 13 is disposed in an XY plane, so the light source 20 may be disposed on any side surface of the light guide component 30, and the transmission direction of the light in the liquid crystal layer 13 may be along the X-axis direction or the Y-axis direction. When the alignment films 14 adopt vertical alignment, the liquid crystal display panel 10 is a vertical alignment (VA)

liquid crystal display panel; the pixel electrode of the liquid crystal display panel is disposed on the array substrate 11; and the common electrodes is disposed on the counter substrate 12.

Wherein, "along the X/Y/Z-axis direction" indicated above not only may be along the positive direction of the coordinate axis but also may be along the negative direction of the coordinate axis. When the alignment films adopt the above alignment directions, not only the photo-alignment means may be adopted but also the rubbing-alignment means may be adopted. In addition, it should be noted that the transparent state and the scattering state of the liquid crystal display panel 10 in FIG. 1 have been described above with reference to FIGS. 1 to 4. When the liquid crystal display panel 10 adopts the structure in FIGS. 5 and 6, the principle of forming the transparent state and the scattering state is the same with the principle of the liquid crystal display panel as shown in FIG. 1. No further description will be given here.

In the embodiment of the present disclosure, considering that color filters (CFs) and black matrixes (BMs) have the function of absorbing light, when the counter substrate 12 is provided with the color filters and the black matrixes, a part of light subjected to total reflection between the array substrate 11 and the counter substrate 12 will be absorbed. In order to avoid this phenomenon, the embodiment of the present disclosure achieves color display by field-sequential-color method, to avoid providing color filters on the counter substrate 12.

Figure 7:
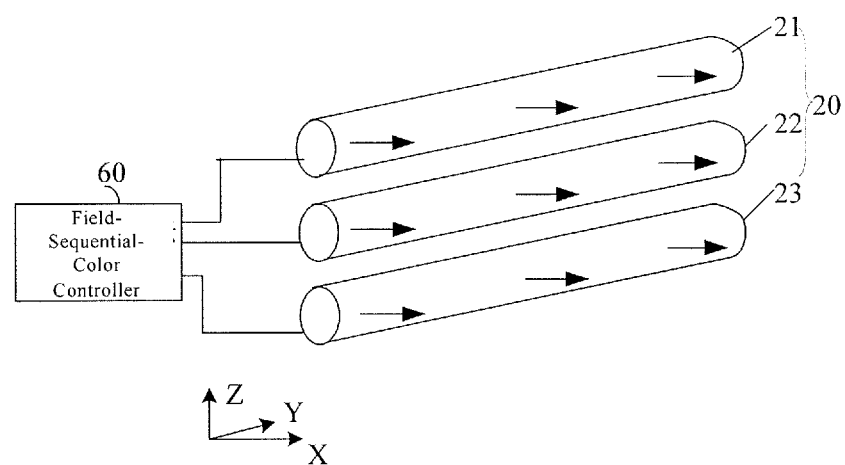
FIG. 7 is a schematic diagram illustrating the connection of a light source and a field-sequential-color controller in an embodiment of the present disclosure.

For example, as shown in FIG. 7, the light source 20 includes a plurality of sub-light sources (red sub-light sources 21, green sub-light sources 22 and blue sub-light sources 23 as shown in the figure), and the color of light emitted by the plurality of sub-light sources is different from each other. The display device further includes a field-sequential-color controller 60. The field-sequential-color controller 60 is connected with the sub-light sources and configured to control the sub-light sources to emit light in different driving periods of one frame. Wherein, each sub-light source may include a plurality of luminescent units such as light-emitting diodes (LEDs); the plurality of sub-light sources are arranged along the Z-axis direction (namely the thickness direction of the liquid crystal display panel 10) in FIG. 7; and the plurality of luminescent units in the same sub-light source are arranged along the Y-axis direction in FIG. 7. Of course, all the luminescent units in the plurality of sub-light sources may also be arranged along the Y-axis direction, and the luminescent units of different colors are arranged in turn.

Description will be given below to the color display process via the field-sequential-color method by taking the red sub-light sources 21, the green sub-light sources 22 and the blue sub-light sources 23 as an example. Wherein, each pixel unit of the liquid crystal display panel 10 is also correspondingly divided into a red subpixel, a green subpixel and a blue subpixel; and each frame is divided into three driving periods.

In the first driving period, the field-sequential-color controller 60 controls the red sub-light sources 21 to emit light; pixel voltage is applied to pixel electrodes corresponding to the red subpixels, so that nematic liquid crystals in areas corresponding to the red subpixels can be deflected to be in the scattering state; and the red subpixels display corresponding gray scales according to the pixel voltage, namely the red subpixels emit red light. Meanwhile, no voltage is applied to pixel electrodes corresponding to the green subpixels and the blue subpixels, and nematic liquid crystals in corresponding areas are in the initial alignment and in the transparent state, so both the green subpixels and the blue subpixels do not emit light.

Similarly, in the second driving period, the field-sequential-color controller 60 controls the green sub-light sources to emit light; the green subpixels emit green light with corresponding gray scale; and the red subpixels and the blue subpixels do not emit light. In the third driving period, the field-sequential-color controller controls the blue sub-light sources 23 to emit light; the blue subpixels emit blue light with corresponding gray scale; and both the red subpixels and the green subpixels do not emit light.

As each driving period only occupies one third of the time of one frame, the human eyes cannot distinguish the display effect of the driving periods. The human eyes can sense the display effect corresponding to the case that the three subpixels emit light simultaneously, namely the display effect after one pixel unit is synthesized.

It should be noted that the case that the light source includes the sub-light sources of three colors red, green and blue is only illustrative. In actual application, the light source may also be set to include a plurality of sub-light sources of other numbers and colors as required.

In order to improve the utilization rate of the light source 20, as shown in FIG. 1, a reflective cover 40 is disposed on one side of the light source 20 away from the side surface of the light guide component 30. The reflective cover 40 is configured to allow the light from the light source 20 to be incident into the side surface of the light guide component 30, so that the light from the light source can be incident into the light guide plate 31 as much as possible, and hence the utilization rate of the light can be improved. Wherein, an opening is formed on the reflective cover 40 and arranged opposite to the side surface of the light guide plate 31, and a surface of an inner wall of the reflective cover 40 is a cambered surface capable of reflecting light.

As described above, the display device may be used for transparent display. Image display is achieved when electric fields are applied in the liquid crystal display panel 10, and the liquid crystal display panel is in the transparent state when no electric field is applied to the liquid crystal display panel 10. In the embodiment of the present disclosure, the display device may also be used for non-transparent display, for instance, mirror display or common non-transparent display. For example, a light-shielding element is disposed at a side of the light guide component 30 away from the liquid crystal display panel 10.

Figure 8:
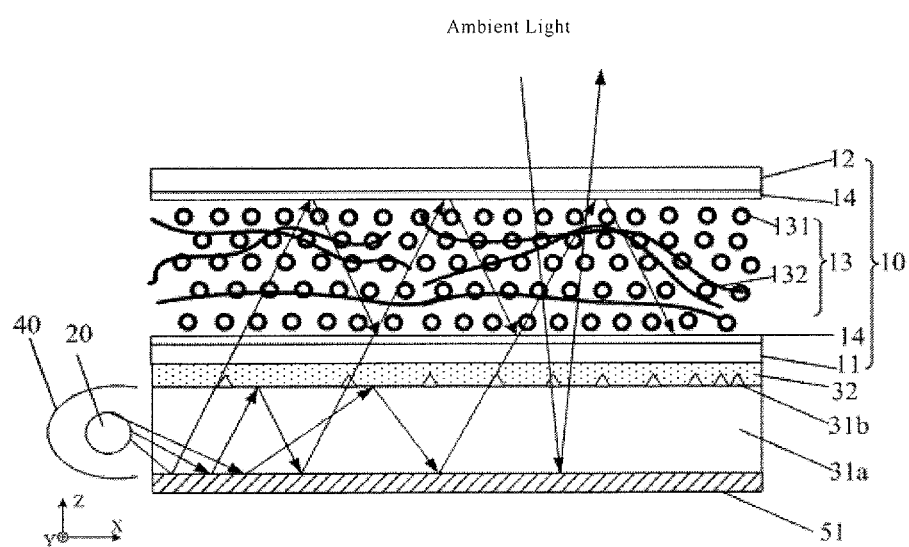
FIG. 8 is a schematic diagram of a display device with a fourth structure provided by an embodiment of the present disclosure in the transparent state.

FIG. 8 is a schematic structural view of the non-transparent display device for mirror display. As shown in FIG. 8, the light-shielding element includes a reflective layer 51, and a reflective surface of the reflective layer 51 faces the light guide component 31. For example, the reflective layer 51 may be a metal plating layer formed on a surface of the light guide plate 31 away from the liquid crystal display panel 10. When the liquid crystal display panel 10 is to display an image, electric fields are applied to pixel units in areas of the image to be displayed, so that the image can be displayed; no electric field is applied to pixel units in the other areas, so corresponding areas are in the transparent state; meanwhile, ambient light on a side (namely a light-emitting side) of the counter substrate 12 away from the array substrate 11 is irradiated to the reflective layer 51 through pixel units in the transparent state, and reflected by the reflective layer 51, so that the display image and a reflected image of an actual environment can be seen simultaneously on the light-emitting side.

Figure 9:
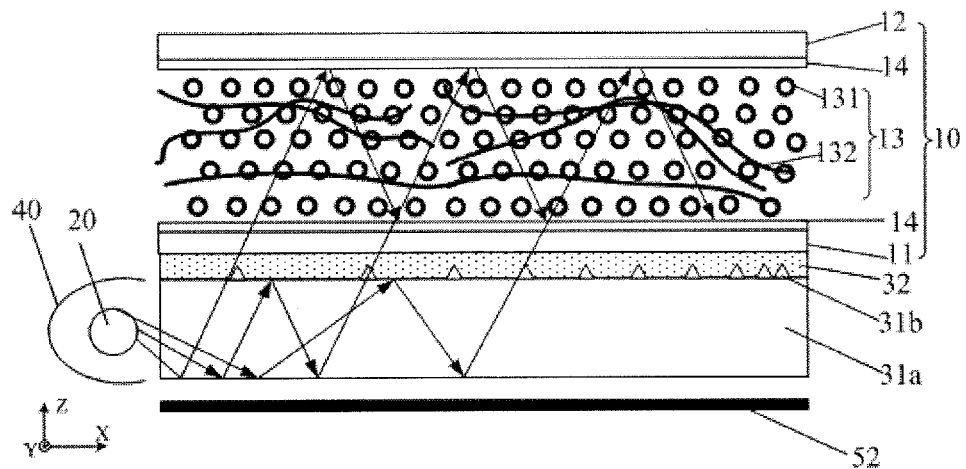
FIG. 9 is a schematic diagram of a display device with a fifth structure provided by an embodiment of the present disclosure in the transparent state.

FIG. 9 is a schematic structural view of the non-transparent display device used for common non-transparent display. The common non-transparent display is that the display device can only display the image but cannot reflect an environmental image or transmit the environmental image. As shown in FIG. 9, the light-shielding element includes a light-absorbing layer 52 used for absorbing light. When the liquid crystal display panel is to display an image, electric fields are applied to pixel units in areas of the image to be displayed, so that the image can be displayed; no electric field is applied to pixel units in the other areas, so that corresponding areas can be in transparent state; as the light-absorbing layer 52 can absorb light, ambient light in front of the liquid crystal display panel 10 is absorbed by the light-absorbing layer 52 after running through areas in the transparent state; and ambient light behind the display device cannot run through the light-absorbing layer 52, so common non-transparent display can be achieved.

When the light-shielding element includes the light-absorbing layer 52, for example, an air layer is formed between the light-absorbing layer 52 and the light guide component 30, so as to form a low-refractive-index layer between the light guide plate 31 and the light-absorbing layer 52. Thus, the light in the light guide plate 31 can be subjected to total reflection on a bottom surface of the light guide plate 31 and will not be directly absorbed by the light-absorbing layer 52, so that the light utilization rate can be improved.

It should be noted that FIGS. 8 and 9 only illustratively provide the structure of the display device. The liquid crystal display panel 10 in FIGS. 8 and 9 may adopt the same structure of the liquid crystal display panel 10 in FIG. 1 and may also adopt the same structure of the liquid crystal display panel 10 in FIG. 5 or 6.

Figure 11:
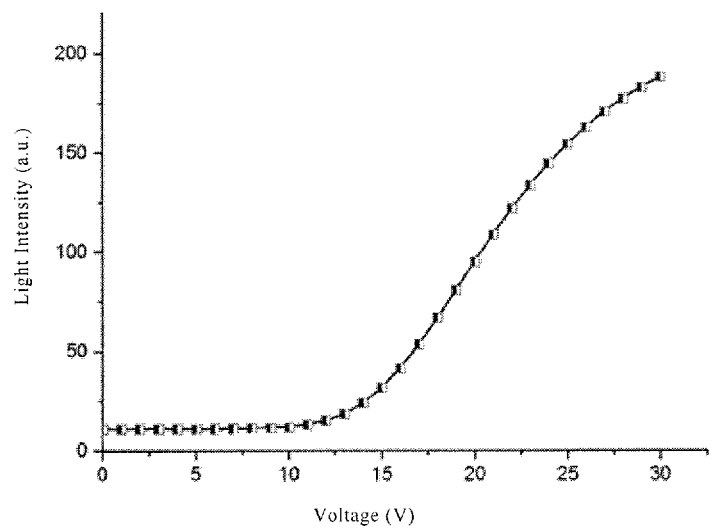
FIG. 11 is a curve diagram illustrating the relationship between light intensity and voltage in a display process of the display device provided by an embodiment of the present disclosure.
Figure 12:
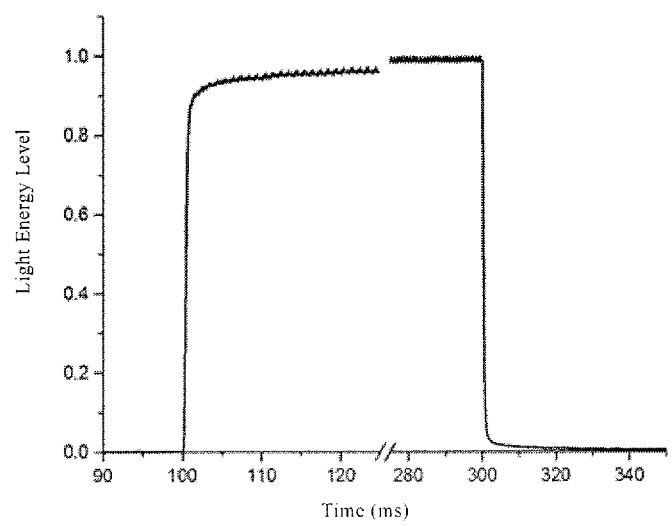
FIG. 12 is a schematic diagram illustrating the relationship between light energy level and time in a display process of the display device provided by an embodiment of the present disclosure.

FIG. 11 is a curve diagram illustrating the relationship between light intensity and driving voltage of the display device provided by the embodiment of the present disclosure. In FIG. 11, along with the increase of the driving voltage, the light intensity is gradually increased; and the increasing trend of the light intensity is stable, which indicates that the display device has good display stability. FIG. 12 is a curve diagram illustrating the relationship between light energy and time of the display device provided by the embodiment of the present disclosure. In FIG. 12, the light energy can rise and fall instantaneously, which indicates that the display device has rapid response speed in photoelectronic switching.

Figure 10:
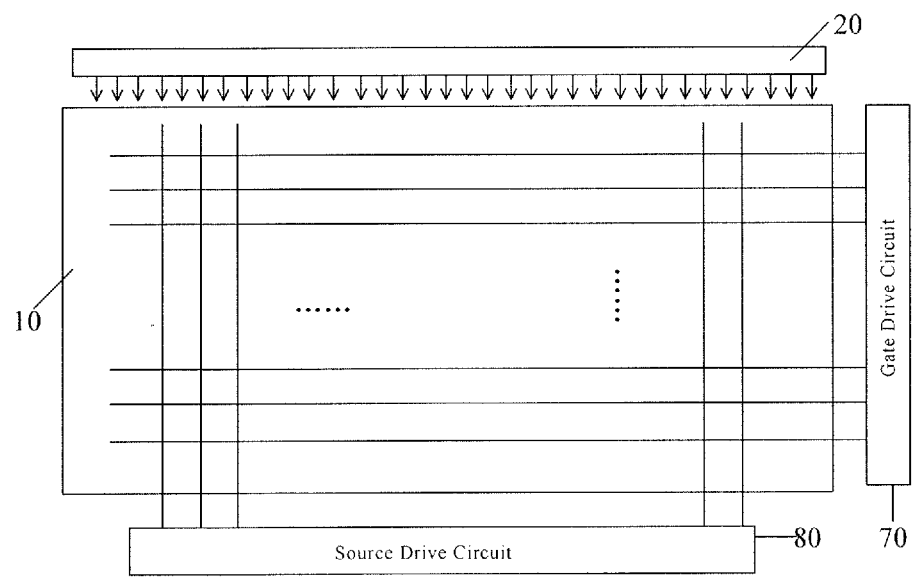
FIG. 10 is a top view of the display device provided by an embodiment of the present disclosure.

The foregoing is the structural description on the display device provided by the embodiment of the present disclosure. Of course, the display device further includes structures such as a gate drive circuit 70 and a source drive circuit 80 (as shown in FIG. 10). No further description will be given here. The manufacturing process of the display device will be described below.

A liquid crystal display panel is manufactured at first. The process specifically includes: forming an array substrate provided with an alignment film and a counter substrate provided with an alignment film; performing cell-assembly on the array substrate and the counter substrate; filling a liquid crystal layer mixed with polymerizable monomers, for instance, a nematic liquid crystal layer mixed with the polymerizable monomers, between the array substrate and the counter substrate; and performing curing treatment on the liquid crystal layer, so that a polymer network can be formed by the polymerizable monomers, in which the curing method may adopt UV curing or thermocuring, which may be specifically determined according to the materials of the polymerizable monomers.

Subsequently, the manufactured liquid crystal display panel and other structures are assembled. When the display device is used as a transparent display device, a light guide component is disposed on one side of the array substrate away from the counter substrate and specifically includes an light guide plate and an adhesive filled between the light guide plate and the liquid crystal display panel, and a light source is disposed on a side surface of the light guide component. When the display device is used as a non-transparent display device, except the light guide component and the light source, a light-shielding layer must also be disposed on one side of the light guide component away from the liquid crystal display panel.

It should be noted that the liquid crystal layer, the layer structures on the array substrate, and the layer structures on the counter substrate are made from materials with substantially the same or similar refractive index, so that the unnecessary scattering phenomenon of the light in the liquid crystal display panel can be avoided, and hence the contrast of the liquid crystal display panel can be effectively improved.

It can be seen from the above description on the display device provided by the embodiment of the present disclosure that: in the display device provided by the embodiment of the present disclosure, the light from the light source forms the surface light source by diffusion through the light guide component at first, and then incident into the liquid crystal layer from different positions of the liquid crystal display panel. Compared with the mode of being directly incident into the liquid crystal layer, the embodiment of the present disclosure can reduce the phenomenon that the light is declined along with the increase of the propagation distance, and hence improve the display uniformity. Moreover, the light guide component includes the light guide plate and the filling layer. The arrangement of the filling layer reduces the difference of the refractive index of the light guide plate and an adjacent dielectric layer, and hence reduces the atomization phenomenon due to the arrangement of the light guide plate. As for the transparent display device, the reduction of the atomization phenomenon can improve the transparency and the contrast of the transparent display device. As for the non-transparent display device, the reduction of the atomization phenomenon can also improve the contrast of the display device. Therefore, the embodiment of the present disclosure can achieve high contrast while improving the display uniformity.

It should be understood that the above embodiments are preferred embodiments adopted only for describing the principle of the embodiment of the present disclosure, and not intended to limit the embodiment of the present disclosure. Various modifications and improvements may be made by those skilled in the art without departing from the spirit and the essence of the embodiment of the present disclosure and shall also fall within the scope of protection of the embodiment of the present disclosure.

What is claimed is:

1. A transparent display device comprising:
    a liquid crystal display panel, comprising a first substrate, a second substrate, and a liquid crystal layer positioned between the first substrate and the second substrate, wherein the liquid crystal layer includes a polymer network formed of polymerizable monomers;
    a light guide component, located on a side of the first substrate opposite to the second substrate, wherein the light guide component has a first main surface facing the liquid crystal display panel, and a second main surface opposite to the first main surface, and a side surface connecting the first main surface and the second main surface; and a light source, located on a side of the light guide component and configured to emit light to enter into the light guide component via the side surface, wherein the light guide component is configured such that light from the light source is emitted out from the first surface of the light guide component into the liquid crystal display panel, and in a case that no voltage is applied to the liquid crystal layer, light from the light source is totally reflected at the liquid crystal display panel without being emitted out from a side of the second substrate opposite to the first substrate into the outside air, wherein the first substrate is a first base substrate and the second substrate is a second base substrate, and light from the light source enters the first base substrate of the liquid crystal display panel with an incident angle greater than or equal to a total reflection critical angle of the second base substrate of the liquid crystal display panel to the outside air, wherein the light guide component includes a light guide plate and a transparent filling layer; the transparent filling layer is filled between the light guide plate and the liquid crystal display panel and in direct contact with the light guide plate and the liquid crystal display panel; a refractive index of the filling layer is larger than a refractive index of the outside air and smaller a refractive index of the light guide plate, wherein the light guide plate includes a light guide plate body and a plurality of optical microstructures formed on a surface of the light guide plate body facing the liquid crystal display panel, the optical microstructures are configured such that light from the light source exits the light guide plate body therefrom, wherein an average value of angles between respective tangential planes of a surface of the optical microstructure and a surface of the light guide plate body is larger than arccos (n1/n2) and less than arccos (n4/n3), wherein, the first substrate and the second substrate are identical in refractive index, n1 is a refractive index of the transparent filling layer, n2 is the refractive index of the light guide plate, n3 is the refractive index of the first and the second substrate, n4 is a refractive index of the outside air; and among n1-n4, n2 is the largest, and n4 is the smallest.

2. The display device according to claim 1, wherein the light guide plate includes a light guide plate body and a plurality of optical microstructures formed inside the light guide plate body; the optical microstructures are configured to reflect light from the light source to exit the light guide plate body from a surface of light guide plate body facing the liquid crystal display panel.

3. The display device according to claim 1, wherein a size of a surface area of the optical microstructures increases as the distance between the optical microstructure to the light source increases.

4. The display device according to claim 1, wherein a distribution density of the optical microstructures increases as the distance between the optical microstructure to the light source increases.

5. The display device according to claim 1, wherein a difference value between n2 and n1 is [0.05, 0.25].

6. The display device according to claim 1, wherein the transparent filling layer is made of an adhesive material.

7. The display device according to claim 1, wherein alignment films are provided on opposite surfaces of the first substrate and the second substrate, and at least one of the alignment films is oriented in a direction perpendicular to the liquid crystal display panel.

8. The display device according to claim 7, wherein alignment directions of the alignment films on the first substrate and the second substrate are identical and parallel to the display surface of the liquid crystal display panel.

9. The display device according to claim 8, wherein the side surface of the light guide component is parallel to the alignment directions of the alignment films.

10. The display device according to claim 7, wherein the alignment directions of the alignment films on the first substrate and the second substrate are perpendicular to each other and are parallel to the display surface of the liquid crystal display panel.

11. The display device according to claim 7, wherein the alignment directions of the alignment films on the first substrate and the second substrate are substantially perpendicular to the liquid crystal display panel.

12. The display device according to claim 1, wherein the light source includes a plurality of sub-light sources, the colors of light emitted from the respective sub-light sources are different from each other; the display device further includes a field-sequential-color controller connected to the respective sub-light sources and is configured to control the respective sub-light source to emit light in different driving time periods of one frame.

13. The display device according to claim 1, further comprising:
a light blocking member located on a side of the light guide component away from the liquid crystal display panel.

14. The display device of claim 13, wherein the light blocking member comprises a reflective layer configured with a reflecting surface facing the light guide component.

15. The display device according to claim 14, wherein the light blocking member includes a light absorbing layer for absorbing light.

16. The display device according to claim 15, wherein an air layer is formed between the light absorbing layer and the light guide component.

* * * * *